(12) United States Patent
Bisti (10) Patent No.: US 11,133,939 B2
(45) Date of Patent: *Sep. 28, 2021

(54) PRIVATE BLOCKCHAIN TRANSACTION MANAGEMENT AND TERMINATION

(71) Applicant: International Business Machines Corporation, Armonk, NY (US)

(72) Inventor: Jeffrey E. Bisti, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 198 days.

This patent is subject to a terminal disclaimer.

(21) Appl. No.: 16/401,123

(22) Filed: May 2, 2019

(65) Prior Publication Data

US 2019/0260593 A1 Aug. 22, 2019

Related U.S. Application Data

(63) Continuation of application No. 15/404,777, filed on Jan. 12, 2017, now Pat. No. 10,355,869.

(51) Int. Cl.
*H04L 29/06* (2006.01)
*H04L 9/32* (2006.01)
*H04L 9/08* (2006.01)

(52) U.S. Cl.
CPC .......... *H04L 9/3247* (2013.01); *H04L 9/0891* (2013.01); *H04L 9/3239* (2013.01); *H04L 2209/38* (2013.01); *H04L 2209/56* (2013.01)

(58) Field of Classification Search
CPC ............. G06Q 20/065; G06Q 20/3678; G06Q 20/38215; H04L 9/0891; H04L 9/30; H04L 9/32; H04L 9/3239; H04L 9/3247; H04L 2209/38; H04L 2209/56
See application file for complete search history.

(56) References Cited

U.S. PATENT DOCUMENTS

| 6,836,548 | B1* | 12/2004 | Anderson | ............... G06F 21/72 |
| | | | | 380/255 |
| 8,832,787 | B1 | 9/2014 | Sanin et al. | |
| 9,351,124 | B1 | 5/2016 | Shelton | |
| 2003/0208511 | A1 | 11/2003 | Earl et al. | |
| 2015/0206106 | A1* | 7/2015 | Yago | ................. G06Q 20/0655 |
| | | | | 705/68 |
| 2015/0332283 | A1 | 11/2015 | Witchey | |
| 2015/0379510 | A1 | 12/2015 | Smith | |
| 2016/0164884 | A1 | 6/2016 | Sriram et al. | |

(Continued)

OTHER PUBLICATIONS

List of IBM Patents or Patent Applications Treated as Related, todays date.

(Continued)

*Primary Examiner* — Malcolm Cribbs (57) ABSTRACT

A blockchain of transactions may be referenced for various purposes and may be later accessed for ledger verification. One example operation may include one or more of identifying a plurality of rules defining a temporary private blockchain, creating a private blockchain block comprising the plurality of rules defining the temporary private blockchain, transmitting an update to a private blockchain block, and designating the temporary private blockchain closed responsive to receiving the update.

20 Claims, 5 Drawing Sheets

(56) References Cited

U.S. PATENT DOCUMENTS

| | | |
|---|---|---|
| 2016/0217436 A1 | 7/2016 | Brama |
| 2016/0224949 A1 | 8/2016 | Thomas et al. |
| 2016/0292672 A1 | 10/2016 | Fay et al. |
| 2017/0005804 A1 | 1/2017 | Zinder |
| 2017/0046806 A1* | 2/2017 | Haldenby .............. G06Q 10/08 |
| 2017/0193619 A1 | 7/2017 | Rollins et al. |
| 2017/0316391 A1* | 11/2017 | Peikert ................. G06Q 20/382 |
| 2018/0006826 A1 | 1/2018 | Smith et al. |
| 2018/0068130 A1 | 3/2018 | Chan et al. |
| 2018/0130034 A1 | 5/2018 | Taylor et al. |
| 2018/0139043 A1 | 5/2018 | Jayachandran et al. |
| 2018/0167198 A1 | 6/2018 | Muller et al. |
| 2018/0189333 A1 | 7/2018 | Childress et al. |

OTHER PUBLICATIONS

Bisti, "Private Blockchain Transaction Management and Termination", U.S. Appl. No. 15/404,777, filed Jan. 12, 2017.
Gramoli; "On the Danger of Private Blockchains", Abstract.
Henderson; "Reasoning about asynchronous behaviour in distributed systems"; Engineering of Complex Computer Systems; 2002; Proceedings; Eighth IEEE International Conference; 17-24; see highlighted sections.
Nakmoto; "Bitcoin: A peer-to-peer electronic cash system"; 2008.
Natoli et al.; "The Blockchain Anomaly"; 2016; arXiv preprint arXiv: 1605.05438.
Patel; "A block chain based decentralized exchange"; See highlighted sections.

* cited by examiner

PRIVATE BLOCKCHAIN TRANSACTION MANAGEMENT AND TERMINATION

TECHNICAL FIELD

This application relates to tracking transactions, and more particularly, to private blockchain transaction management and termination.

BACKGROUND

Blockchain configurations provide secure storage for transactions which have been logged in a blockchain. The immutable structure of the blockchain is desirable for financial transactions which require various types of information for security purposes. In general, any blockchain configuration can grow quickly in size and may be too large for certain computing resources associated with certain networks and users.

Blockchains are, by design, a back-linked list, which allow new blocks of information to be chained onto the latest block. There are no user accounts or controlling servers, so no single entity can revise the collective blockchain for their own advantage. Each time a change is made to a blockchain, it is an appended update, not a modification update, and such an update requires the full history of changes in order to validate any future proposed transaction. Each update to a blockchain should also be verified cryptographically, which typically requires a substantial amount of computer processing resources. This situation is not ideal for devices with limited memory or computing resources, which may not able to handle multiple concurrent blockchain entries or "conversations".

Entities using a blockchain-type ledger may find that the public worldwide blockchain is too slow, large, or expensive for their own utilization. To help mitigate this issue, they may wish to use private distributed ledgers, also known as private blockchains. There are methods that exist for linking off-chain transactions back to a master/parent blockchain, most notably the effort referred to as sidechains, however these implementations are all based around a common currency/token, and operate by summarizing the off-chain transactions so that they can be carried out after-the-fact. However, such an approach does not work well for entities using private blockchains for uses other than transferring ownership of currency. Even private 'off-blockchain' blockchain transactions do not have an established method for marking the conclusion of a series of transactions, which can be costly in terms of computation cycles, resources, and money, for interested parties. By its very nature, a private blockchain should be easily finalized, abandoned and/or absorbed into a different blockchain when the participants agree to such a result.

SUMMARY

One example embodiment may include a method comprising one or more of identifying a plurality of rules defining a temporary private blockchain, creating a private blockchain block comprising the plurality of rules defining the temporary private blockchain, transmitting an update to a private blockchain block, and designating the temporary private blockchain closed responsive to receiving the update.

Another example embodiment may include an apparatus including a processor configured to perform one or more of identify a plurality of rules defining a temporary private blockchain, create a private blockchain block comprising the plurality of rules defining the temporary private blockchain, and a transmitter configured to transmit an update to a private blockchain block, and wherein the processor is further configured to designate the temporary private blockchain closed responsive to receiving the update.

Still another example embodiment may include a non-transitory computer readable storage medium configured to store instructions that when executed cause a processor to perform one or more of identifying a plurality of rules defining a temporary private blockchain, creating a private blockchain block comprising the plurality of rules defining the temporary private blockchain, transmitting an update to a private blockchain block, and designating the temporary private blockchain closed responsive to receiving the update.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide using an off-blockchain private blockchain to track transactions, and to identifying certain transactions in the private blockchain for optimal transaction tracking. Another embodiment provides a mechanism beneficial to groups of entities (for example a small group) participating in short-term negotiations which are likely to require private ledgers. Using a two-stage negotiation, the cost of a transaction is one way to determine a finalization measure which triggers a conclusion of a private blockchain. Utilizing this mechanism, a private blockchain participating entity, such as a network peer or other transaction creating or verifying entity, is able to propose when a transaction is completed. Based on a lack of further participation or a lack of objections from any other previously-engaged participant, the conclusion action may be performed to finalize usage of the private blockchain. A set of established rules and checks ensure that an unprivileged entity is not able to terminate the private blockchain so long as it is being actively used by other participants. Once concluded, a second mechanism permits for the private blockchain to be absorbed/persisted/maintained/archived by a larger, more established, and/or permanent parent blockchain. This approach identifies characteristics of a blockchain communication, such as transactions being proposed in blocks, as well as the cost associated with each proposed transaction as a way of establishing a consensus among the participants of the private blockchain.

Figure 1:
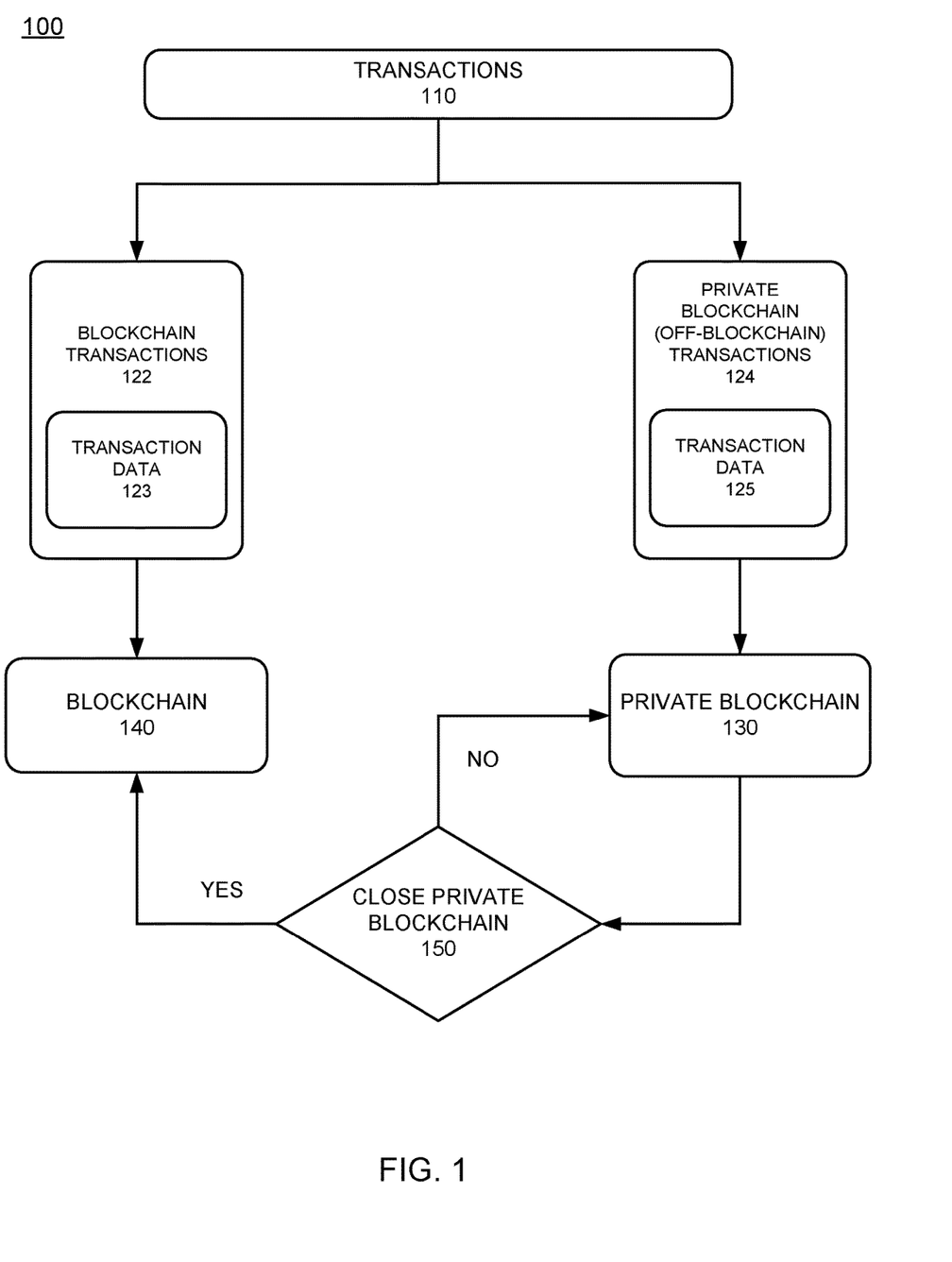
FIG. 1 illustrates an off-blockchain private blockchain configuration according to example embodiments.

FIG. 1 illustrates an off-blockchain private blockchain configuration according to example embodiments. Referring to FIG. 1, the configuration 100 includes a set of transactions 110 which may be received and processed according to one or more possible information chains. For example, one transactions may be intended for a blockchain 122 which stores transaction data 123. Another option may be a private blockchain 124 which stores specific off-blockchain data 125 designated for the private blockchain. The blocks stored in the private blockchain 130 and the blockchain 140 may be stored separately based on the transactions received and their designation. The blockchains and blocks can be stored on one or more devices, in a network, including a processor and memory. Upon the creation of a new private blockchain, participants may agree to a set of rules for the private blockchain. These rules may be established specifically based on user interests/goals or to help expedite transactions. When using a larger, established, and globally-used blockchain, transactions may be large and slow, however, by established a faster block mining cycle, smaller block updates, and simpler consensus/voting procedures, a small group of entities participating in a short-lived negotiation perform their work in a fraction of the time off-chain. The participants are also able to propose whether the blocks are mined, pre-mined, or both.

Aside from the user-generated rules and parameters, a mechanism may also be included for establishing short-lived private blockchains that permits participants to select a conclusion to the private blockchain. For example, if there are no objections or further updates posted in a particular amount of time, over a certain number of transactions, etc., the owner (who may be the default user) or other participant with privileges may submit a conclusion transaction which is identified and used to close the private blockchain 150. The conclusion may be identified and received and processed. The result may be porting the contents of the private blockchain to the blockchain 140 for archiving. The last user with any interest in the private blockchain may be considered the default user or owner. Users without interest or those who have already left the blockchain will simply cease interacting.

A private blockchain is created when two or more parties have a need to carry-out a transaction or negotiation where the specifications of the original blockchain do not meet one or more requirements. For example, two autonomous vehicles needing to negotiate a right-of-way at an intersection may need to figure out who proceeds and who yields, and this negotiation needs to take place quickly. They may elect to create a blockchain with one second consensus intervals, as opposed to a default 10-minute consensus intervals of a more widely-used blockchain. The parties may also want the ultimate outcome of the negotiation to result with output on the main/original blockchain, but the priority on solving the problem at hand placed on a private blockchain that can operate faster and then be used to reference the main blockchain. As for the technical act of creating a blockchain, there are several known methods to quickly create a blockchain for any fundamental purpose.

The submitter of the first blockchain block, which publishes nothing but their proposed blockchain conclusion, effectively closes the blockchain by appending a second and final update which satisfies condition set out in the first blockchain block. Additionally, a public portion of a newly generated public/private key pair may be included in the conclusion block used to conclude the blockchain. The privately-held private key then permits signing and verify further communications which proves ownership of the concluded private blockchain should it be required in the future. The blockchain may then be designated as officially "abandoned" instead of being just informally abandoned by lack of transactions.

In a blockchain update, there is an area for header information where metadata and validation information is generally cited. After the header, there are typically individual updates, lumped together into a block. The updates can contain any type of information, however, there is an understanding that they can contain a certain amount of data, which can be used for any number of purposes. When the private blockchain is initiated, one of the rules that is agreed upon by the participants, and enforced in the chaincode, is that if a block is created with only a single update, and that single update contains an identifier in its data block (i.e., the conclusion flag), and if the subsequent update also contains only a single update, which also contains the conclusion flag, then the chain is considered terminated, and no further updates will be recognized. When a private blockchain terminates, a checksum/hash of the transaction is created to provide a method for proving validation for that private blockchain if it is needed later on. For example, if a party wanted to prove that they had a right of way in an intersection, and provided the series of updates making up their private blockchain, they could also reference the checksum/hash entry on the larger/original blockchain as proof that their evidence was not tampered.

To better illustrate this process, updates are made to a collective blockchain in groups, which makes up a block. A successful conclusion will happen only if a block containing a proposed conclusion is followed by a second block update containing nothing but a single transaction consisting of a conclusion flag and a public key. Once those conditions are met, no further updates proposed to that private blockchain will be recognized and it is acceptable for interested parties to either archive or purge any resources associated with that blockchain. If parties continue to use that private blockchain, it remains open and open to updates, as the above conditions have not been met in this example. Once the second block is appended, the checksum signature of the entire private blockchain, including the public key, goes into a public blockchain.

Figure 2:
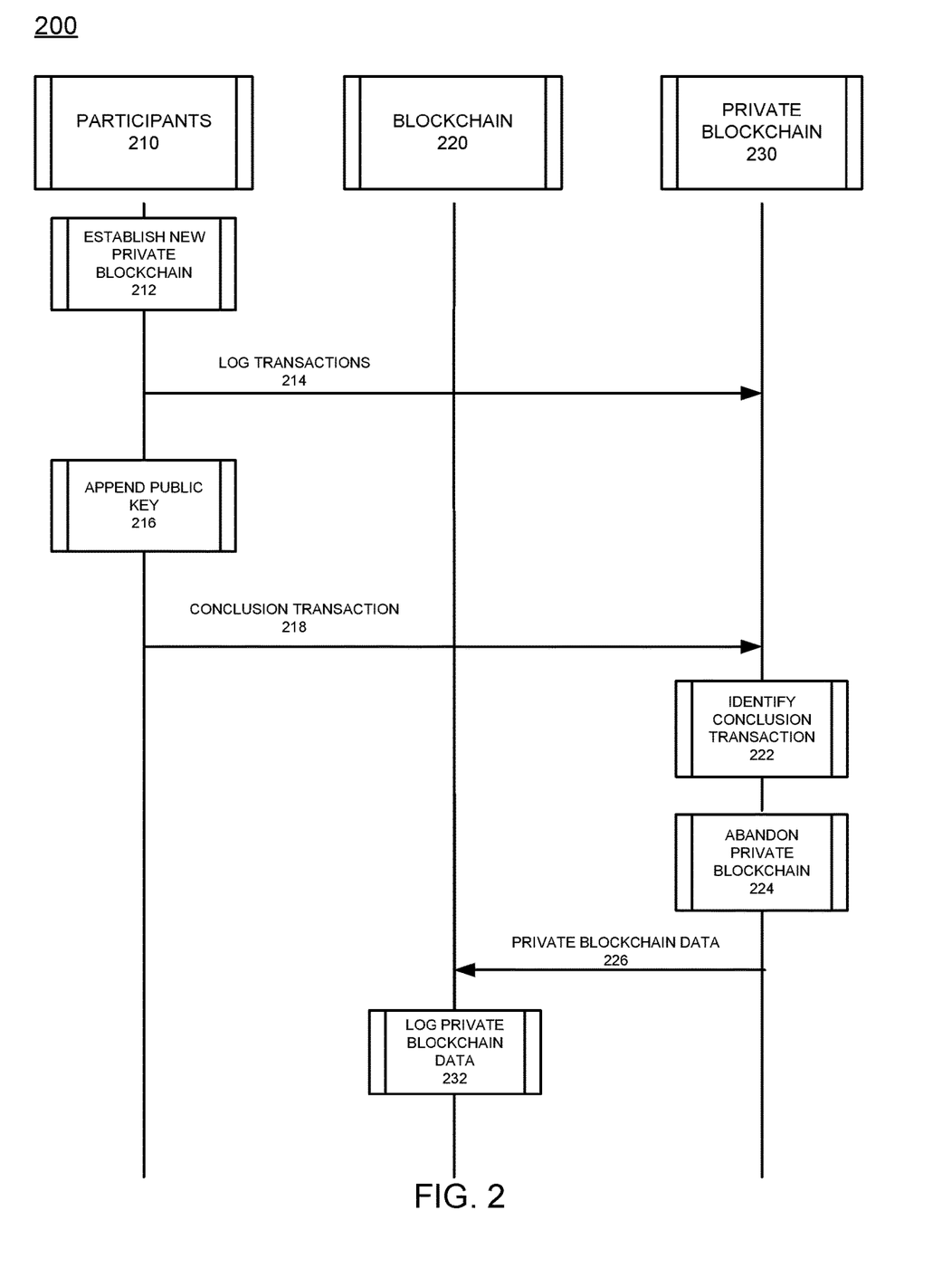
FIG. 2 illustrates an off-blockchain system procedure diagram according to example embodiments.

FIG. 2 illustrates an off-blockchain system procedure diagram according to example embodiments. Referring to FIG. 2, system configuration 200 includes one or more participants 210, which are responsible for establishing the private blockchain 230. The rules can be used to establish a point in time where no further updates will be recognized by any participants. At this point, interested parties can persist the private blockchain at their own expense or the entire private blockchain may be erased and/or closed from future updates. The basic elements of a blockchain-type system require a token to process transactions from proposal to acceptance. The participants 210 may setup the private blockchain 212 based on constraints. The transactions 214 may be logged in the private blockchain 230 as they are identified as private blockchain transactions. The end of the private blockchain may be first identified by a public key 216, which is appended to a transaction along with a conclusion flag or other conclusion indicator, etc. The conclusion transaction 218 can then be created and sent to the private blockchain 230. The private blockchain 230 may identify the conclusion to the private blockchain 222 and abandon/stop/cancel/pause, etc., the private blockchain 224. The private blockchain data 226 may be formatted into transactions for a blockchain 220 so the data 232 is preserved for future reference. The participant 210 and blockchains 220 and 230 can be stored on, or may be, one or more devices, in a network, including a processor and memory.

Once the checksum signature of the entire private blockchain is determined and the data is integrated into a public blockchain there are a number of results that follow. As no further updates are permitted, interested parties may access the data of the private blockchain at their own expense. A pair of data may be created that can be used to validate a series of transactions that occurred entirely off the public blockchain. Linking a moment-in-time on the public ledger with a series of transactions that took place on a private ledger through a public/private key may also be performed. This information can now be made available through any method that the owner-by-default prefers. Interested parties who do not nominate themselves to "own" the blockchain can still use their own copies of the blockchain and validate it using the publicly-available checksum on the master/parent blockchain. This permits parties desiring to use an off-chain (private blockchain) method of communication for faster-speed and lower-cost communication, but which want to ensure that the full log of transactions is verifiable through an immutable ledger such as the public worldwide blockchain.

An example where a private blockchain might be enabled is in an auction-type situation follows. For instance, there are a number of potential bidders, and bidding will be open for 24 hours, with block updates being appended every 5 minutes, with each block being 256 kb. The general-purpose blockchain is not ideal for this type of engagement, nor would most businesses be interested in writing the code to create this blockchain. It should be expected that a business or individual would be able to create a blockchain matching their requirements on-demand, and then provide the details of their newly-created blockchain to participants.

One example embodiment may include terminating a series of transactions in a private off-chain blockchain transaction upon the creation of a new private blockchain. The participants may agree to a set of rules of engagement using a two-stage negotiation, including the cost of a transaction, driving a private blockchain to conclusion and building a consensus proposing, by a participating entity, that a transaction is over based solely on a lack of further participation (and therefore, objection) from any other previously-engaged participant. A block containing a proposed conclusion is followed by a second block update containing nothing but a single transaction, consisting of another conclusion flag and a public key persisting the private blockchain by a parent blockchain. A public/private key pair is used so that a user can prove that it was them who terminated a blockchain. It is not entirely necessary, however, if for whatever reason, the private blockchain is not "absorbed" back into the original blockchain, it provides an additional method for a participant to acknowledge, for example, "I closed down that blockchain, and I can provide a digital signature that corresponds with that public key to prove it". Since a blockchain lacks a concept of user IDs, this provides an additional method of tying a transaction back to a single actor. Also, if the private blockchain were being used by a number of microcontrollers in an industrial environment, and it was known that a blockchain going beyond 100 GB in size would crash the system, the participants would want to agree on an established trigger as a memory size or other computational constraint.

Figure 3A:
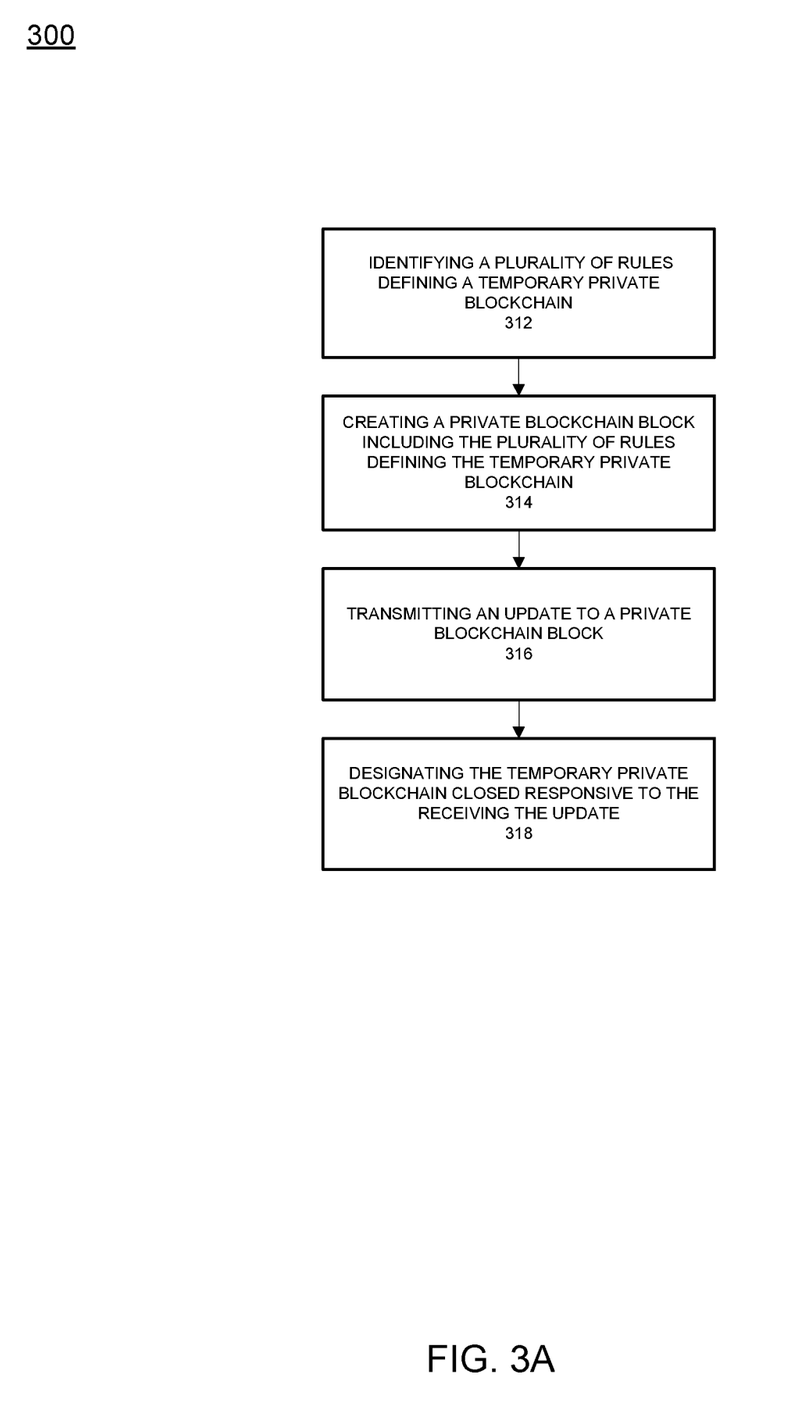
FIG. 3A illustrates a flow diagram of an example method of establishing and using private blockchain according to example embodiments.

FIG. 3A illustrates a flow diagram of an example method of establishing and using a private blockchain according to example embodiments. Referring to FIG. 3A, the method 300 may include one or more of identifying a plurality of rules defining a temporary private blockchain 312, creating a private blockchain block including the plurality of rules defining the temporary private blockchain 314, transmitting an update to the first private blockchain block as a transaction with a predefine parameter which would invoke a change in the private blockchain status 316, and designating the temporary private blockchain closed responsive to receiving the update 318. The update transaction may include a public key and the method may also include generating a private key to sign and verify a communication session outside the private blockchain. The method may also include designating the private blockchain abandoned, responsive to the update being transmitted. The update may include a conclusion block including a conclusion flag and a public key. Additionally, responsive to the conclusion block being processed, the method may also provide designating the private blockchain as part of a public blockchain and storing a checksum signature of transactions on the private blockchain in the public blockchain. The method may also include linking the public blockchain to a plurality of transactions on the private blockchain via the public key and a private key.

Figure 3B:
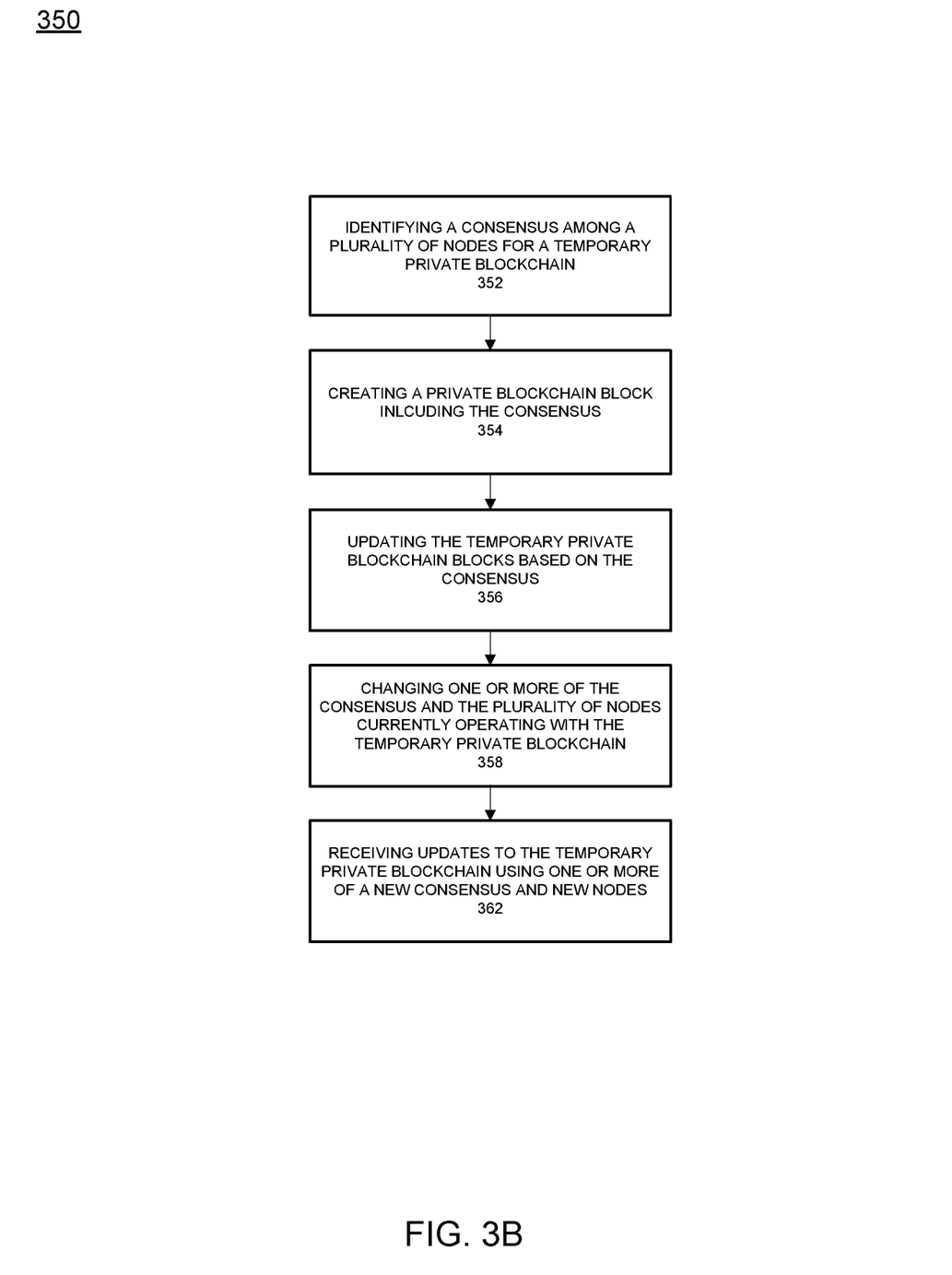
FIG. 3B illustrates a flow diagram of another example method of establishing and using a private blockchain according to example embodiments.

FIG. 3B illustrates a flow diagram of another example method of establishing and using a private blockchain according to example embodiments. Referring to FIG. 3B, in this example 350, the method may include one or more of identifying a consensus among a plurality nodes for a temporary private blockchain 352. The nodes may be attempting to agree on a particular private blockchain configuration and when to abandon the private blockchain, how to preserve the private blockchain data after it is completed, etc. The method may also include creating a private blockchain block including the consensus 354, updating the temporary private blockchain blocks based on the consensus 356, and changing one or more of the consensus and the plurality of nodes currently operating with the temporary private blockchain 358, and receiving updates to the temporary private blockchain using one or more of a new consensus and new nodes 362. As new nodes are rotated into the private blockchain usage, the rules may change and the rights may change as well to accommodate the new nodes without abandoning the private blockchain. A consensus algorithm that is used in the private blockchain and may shift to a modified consensus and/or the same consensus could be shifted to a new set of nodes seeking access to the private blockchain. This provides ease of dynamic changes to the temporary/private blockchain whether it be for the nodes or the consensus or both. In this example, the private blockchain does not need to be concluded, instead it is preserved and changed similar to a real blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
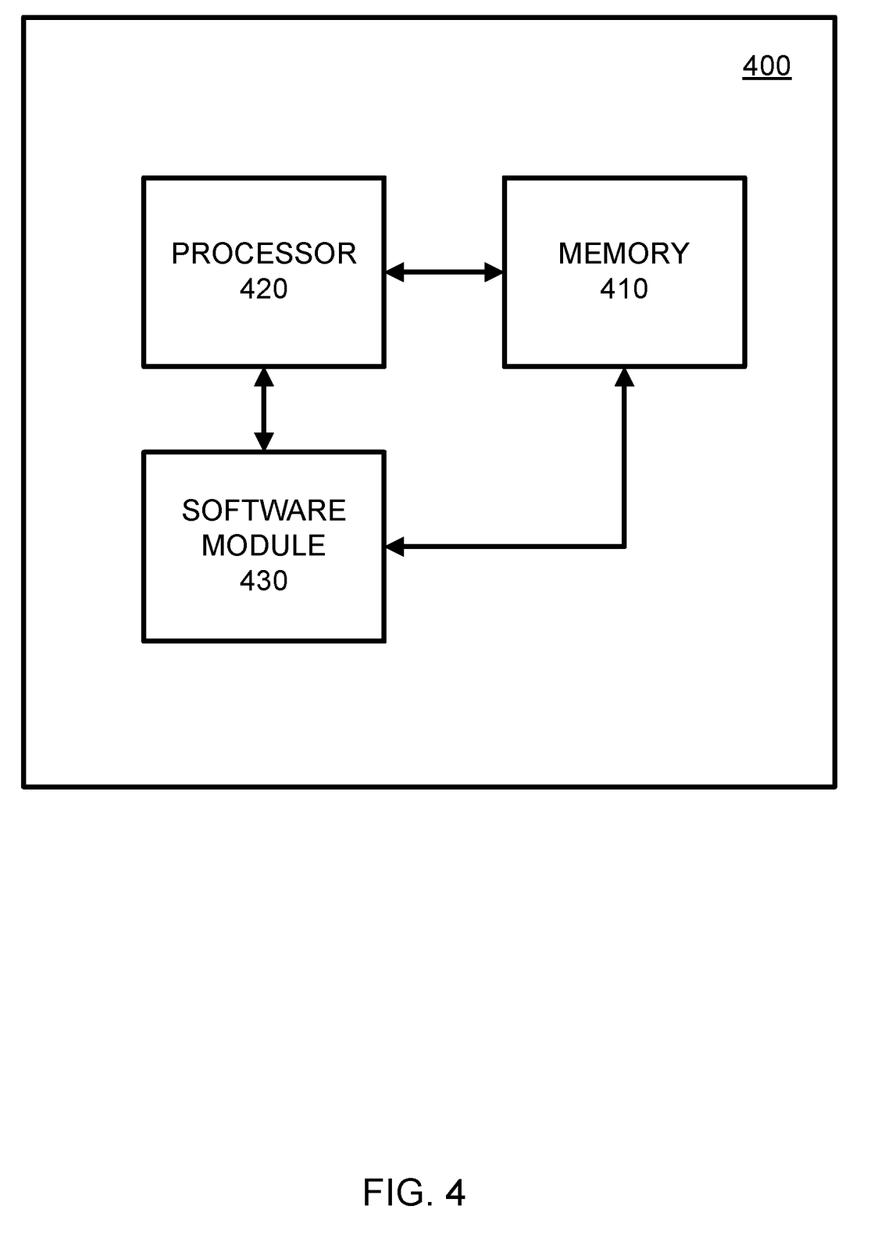
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   creating a private blockchain block comprising a plurality of rules defining a private blockchain;
   transmitting an update including a conclusion block comprising a public key to the private blockchain block;
   linking a public blockchain to the private blockchain via the public key; and
   storing a checksum signature of transactions on the private blockchain in the public blockchain based on the conclusion block being processed.

2. The method of claim 1, wherein the conclusion block further comprises a conclusion flag.

3. The method of claim 1, further comprising:
   generating a private key to sign and verify a communication session outside the private blockchain.

4. The method of claim 1, further comprising:
   designating the private blockchain abandoned, responsive to the update being transmitted.

5. The method of claim 1, further comprising:
   designating the private blockchain closed responsive to receiving the update.

6. The method of claim 1, further comprising:
   identifying the plurality of rules defining the private blockchain.

7. The method of claim 1, wherein the linking the public blockchain to the private blockchain further comprising:
   linking the public blockchain to the private blockchain via a private key.

8. An apparatus, comprising:
   a hardware-implemented processor configured to:
   create a private blockchain block comprising a plurality of rules that define a private blockchain;
   transmit an update that includes a conclusion block comprising a public key to the private blockchain block;
   link a public blockchain to the private blockchain via the public key; and
   store a checksum signature of transactions on the private blockchain in the public blockchain based on the conclusion block being processed.

9. The apparatus of claim 8, wherein the conclusion block further comprises a conclusion flag.

10. The apparatus of claim 8, wherein the processor is further configured to:
    generate a private key to sign and verify a communication session outside the private blockchain.

11. The apparatus of claim 8, wherein the processor is further configured to:
    designate the private blockchain abandoned, responsive to the update being transmitted.

12. The apparatus of claim 8, wherein the processor is further configured to:
    designate the private blockchain closed responsive to receipt of the update.

13. The apparatus of claim 8, wherein the processor is further configured to:
    identify the plurality of rules that define the private blockchain.

14. The apparatus of claim 8, wherein; when the processor is configured to link the public blockchain to the private blockchain the processor is further configured to:
    link the public blockchain to the private blockchain via a private key.

15. A non-transitory computer readable storage medium configured to store one or more instructions that when executed by a processor causes the processor to perform:
    creating a private blockchain block comprising a plurality of rules defining a private blockchain;
    transmitting an update including a conclusion block comprising a public key to the private blockchain block;
    linking a public blockchain to the private blockchain via the public key; and
    storing a checksum signature of transactions on the private blockchain in the public blockchain based on the conclusion block being processed.

16. The non-transitory computer readable storage medium of claim 15, wherein the conclusion block further comprises a conclusion flag.

17. The non-transitory computer readable storage medium of claim 15, wherein the one or more instructions are further configured to cause the processor to perform:
    generating a private key to sign and verify a communication session outside the private blockchain.

18. The non-transitory computer readable storage medium of claim 15, wherein the one or more instructions are further configured to cause the processor to perform:
    designating the private blockchain abandoned, responsive to the update being transmitted.

19. The non-transitory computer readable storage medium of claim 15, wherein the one or more instructions are further configured to cause the processor to perform:
    designating the private blockchain closed responsive to receiving the update.

20. The non-transitory computer readable storage medium of claim 15, wherein, when the processor is configured to perform the linking the public blockchain to the private blockchain, the processor is further configured to the processor to perform:
    linking the public blockchain to the private blockchain via a private key.

* * * * *